(12) United States Patent
Pradeep

(10) Patent No.: US 10,846,895 B2
(45) Date of Patent: Nov. 24, 2020

(54) IMAGE PROCESSING MECHANISM

(71) Applicant: Anantha Pradeep, Piedmont, CA (US)

(72) Inventor: Anantha Pradeep, Piedmont, CA (US)

( * ) Notice: Subject to any disclaimer, the term of this patent is extended or adjusted under 35 U.S.C. 154(b) by 0 days.

(21) Appl. No.: 14/948,663

(22) Filed: Nov. 23, 2015

(65) Prior Publication Data
US 2017/0147867 A1    May 25, 2017

(51) Int. Cl.
*G06T 11/60*    (2006.01)
(52) U.S. Cl.
CPC ................................ *G06T 11/60* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,088,040 A * | 7/2000 | Oda | ........................ | G06T 13/40 345/441 |
| 6,134,345 A * | 10/2000 | Berman | ................... | G06T 11/60 382/162 |
| 6,134,346 A * | 10/2000 | Berman | ................ | H04N 1/3872 345/629 |
| 6,201,548 B1 * | 3/2001 | Cariffe | ..................... | G06T 11/60 345/620 |
| 6,269,195 B1 * | 7/2001 | Gonsalves | ................ | G06T 5/20 348/E5.052 |
| 6,288,703 B1 * | 9/2001 | Berman | ................... | H04N 9/75 345/421 |
| 6,959,099 B2 * | 10/2005 | Gutta | ...................... | G06T 5/002 382/100 |
| 6,973,220 B2 * | 12/2005 | Sakurai | .................. | H04N 5/232 348/207.99 |
| 7,053,953 B2 * | 5/2006 | Belz | ..................... | H04N 1/0044 348/333.02 |
| 7,203,356 B2 * | 4/2007 | Gokturk | ............. | G06K 9/00228 375/E7.083 |
| 7,574,070 B2 * | 8/2009 | Tanimura | ........... | G06K 9/00362 345/632 |

(Continued)

OTHER PUBLICATIONS

Bitouk et al., Face Swapping: Automatically Replacing Faces in Photographs, Aug. 2008, ACM Transactions on Graphics, vol. 27, No. 3, pp. 39:1-29:8.*

(Continued)

*Primary Examiner* — Motilewa Good Johnson
(74) *Attorney, Agent, or Firm* — Kwan & Olynick LLP

(57) ABSTRACT

Provided are mechanisms and processes for automatically removing an individual from an image or group of images. One example method includes receiving a request to remove an individual from an image. Specifically, this request includes a selection of the individual's face in the image. Next, preferences relating to removal of the individual are received, such as preferred selections about whether to remove the individual completely from the image, whether to replace the individual with a substitute, and whether to retain selected individuals in the image. Facial features associated with the individual and body features associated with the individual are then identified and the individual is removed from the image based on the preferences provided relating to removal of the individual and surrounding elements.

10 Claims, 7 Drawing Sheets

(56) References Cited

U.S. PATENT DOCUMENTS

| | | | | |
|---|---|---|---|---|
| 7,653,259 B2* | 1/2010 | Pilu | ..................... | H04N 1/00167 382/115 |
| 8,098,904 B2* | 1/2012 | Ioffe | ................. | G06K 9/00281 382/118 |
| 8,203,609 B2* | 6/2012 | Jung | ................... | H04N 1/0084 348/143 |
| 8,472,667 B2* | 6/2013 | Suzuki | .............. | G06K 9/00771 348/169 |
| 8,826,458 B2* | 9/2014 | Arisawa | ............... | H04L 67/306 709/226 |
| 9,165,405 B2* | 10/2015 | Meier | ..................... | G06T 15/20 |
| 9,330,476 B2* | 5/2016 | Shechtman | .......... | H05K 999/99 |
| 2001/0055414 A1* | 12/2001 | Thieme | ................... | G06T 11/60 382/135 |
| 2004/0164996 A1* | 8/2004 | Criminisi | .............. | G06T 11/001 345/619 |
| 2004/0228530 A1* | 11/2004 | Schwartz | ................. | G06K 9/38 382/173 |
| 2005/0129324 A1* | 6/2005 | Lemke | ................... | H04N 1/387 382/254 |
| 2007/0086675 A1* | 4/2007 | Chinen | ................... | G06T 11/00 382/284 |
| 2007/0252831 A1* | 11/2007 | Lind | ....................... | G06T 11/60 345/419 |
| 2008/0052161 A1* | 2/2008 | Cohen | ................... | G06Q 10/06 705/14.1 |
| 2008/0316328 A1* | 12/2008 | Steinberg | ............... | G06K 9/036 348/222.1 |
| 2009/0202170 A1* | 8/2009 | Weiss | ...................... | G06T 5/005 382/275 |
| 2009/0207269 A1* | 8/2009 | Yoda | ...................... | G06T 11/60 348/222.1 |
| 2010/0007665 A1* | 1/2010 | Smith | ..................... | G06T 13/40 345/473 |
| 2010/0027961 A1* | 2/2010 | Gentile | .................... | G06T 5/50 386/278 |
| 2010/0266207 A1* | 10/2010 | Zhang | ................... | H04N 5/262 382/195 |
| 2011/0103706 A1* | 5/2011 | Jeong | ..................... | G06T 5/005 382/254 |
| 2011/0202968 A1* | 8/2011 | Nurmi | .................... | G06F 21/10 726/1 |
| 2011/0261050 A1* | 10/2011 | Smolic | .................... | G06T 15/20 345/419 |
| 2013/0011068 A1* | 1/2013 | Albouyeh | ............... | G06F 21/36 382/190 |
| 2013/0093788 A1* | 4/2013 | Liu | ......................... | G06F 3/011 345/633 |
| 2013/0094780 A1* | 4/2013 | Tang | ........................ | G06T 11/60 382/284 |
| 2013/0135298 A1* | 5/2013 | Isogai | ................... | G06T 15/205 345/419 |
| 2014/0226000 A1* | 8/2014 | Vilcovsky | ............... | G06F 3/017 348/77 |
| 2014/0313188 A1* | 10/2014 | Cohen | ................ | H04N 13/0011 345/419 |
| 2017/0132819 A1* | 5/2017 | Paris | ....................... | G06T 11/60 |

OTHER PUBLICATIONS

Papari, N. Petkov and P. Campisi, "Artistic Edge and Corner Enhancing Smoothing," in IEEE Transactions on Image Processing, vol. 16, No. 10, pp. 2449-2462, Oct. 2007 (Year: 2007).*

* cited by examiner

IMAGE PROCESSING MECHANISM

TECHNICAL FIELD

The present disclosure relates to mechanisms and processes for performing image processing on an image or group of images.

BACKGROUND

People take photographs to memorialize various life events and experiences. Although these photographs have the ability to bring back positive memories of these life events and experiences, some photographs may also bring back negative memories of these life events and experiences. For instance, even if a picture evokes a generally good feeling, it may include an ex-spouse, former friend, former acquaintance, or other person that may evoke negative or unfavorable memories. One solution is to avoid the pictures altogether, such as by storing them away, discarding them, or deleting them.

However, avoiding these pictures may result in the loss of chunks of pictures representing a person's life, thereby causing some feeling of loss with these gaps in photographic memories. Moreover, pictures may also include other people, scenery, monuments, etc. that may have elements that would be beneficial to keep. Accordingly, it is desirable to find new ways of preserve positive aspects of photographic memories, while removing negative aspects of photographic memories.

SUMMARY

Provided are various mechanisms and processes relating to removing an individual from an image or group of images.

In one aspect, which may include at least a portion of the subject matter of any of the preceding and/or following examples and aspects, a process includes automatically removing an individual from an image. The process includes receiving a request to remove an individual from an image. Specifically, this request includes a selection of the individual's face in the image. Next, preferences relating to removal of the individual are received, such as preferred selections about whether to remove the individual completely from the image, whether to replace the individual with a substitute, and whether to retain selected individuals in the image. Facial features associated with the individual and body features associated with the individual are then identified and the individual is removed from the image based on the preferences provided relating to removal of the individual and surrounding elements.

In another aspect, which may include at least a portion of the subject matter of any of the preceding and/or following examples and aspects, a process includes removing an individual from a group of images. The process includes receiving a request to remove an individual from a group of images, along with one or more facial samples associated with the individual. Each facial sample includes either a portrait of the individual or a selection of the individual's face from a group photo. The process also includes receiving preferences relating to removal of the individual, including preferred selections such as whether to remove the individual completely from the group of images, whether to replace the individual with a substitute, and whether to retain selected individuals in the series of images. Next, the individual and surrounding elements are identified in each image in the group of images, where the surrounding elements include any selected individuals. Finally, the individual is removed from each image in the group of images based on the preferences specified relating to removal of the individual.

In yet another aspect, which may include at least a portion of the subject matter of any of the preceding and/or following examples and aspects, a computer readable medium includes computer code for removing an individual from a group of images. Specifically, the computer readable medium includes computer code for receiving a request to remove an individual from a group of images, along with computer code for receiving one or more facial samples associated with the individual. Each facial sample includes either a portrait of the individual or a selection of the individual's face from a group photo. The computer readable medium also includes computer code for receiving preferences relating to removal of the individual, including preferred selections such as whether to remove the individual completely from the group of images, whether to replace the individual with a substitute, and whether to retain selected individuals in the series of images. Furthermore, the computer readable medium includes computer code for identifying the individual and surrounding elements in each image in the group of images and computer code for removing the individual from each image in the group of images based on the preferences specified relating to removal of the individual.

These and other embodiments are described further below with reference to the figures.

DETAILED DESCRIPTION OF EXAMPLE EMBODIMENTS

Figure 1A:
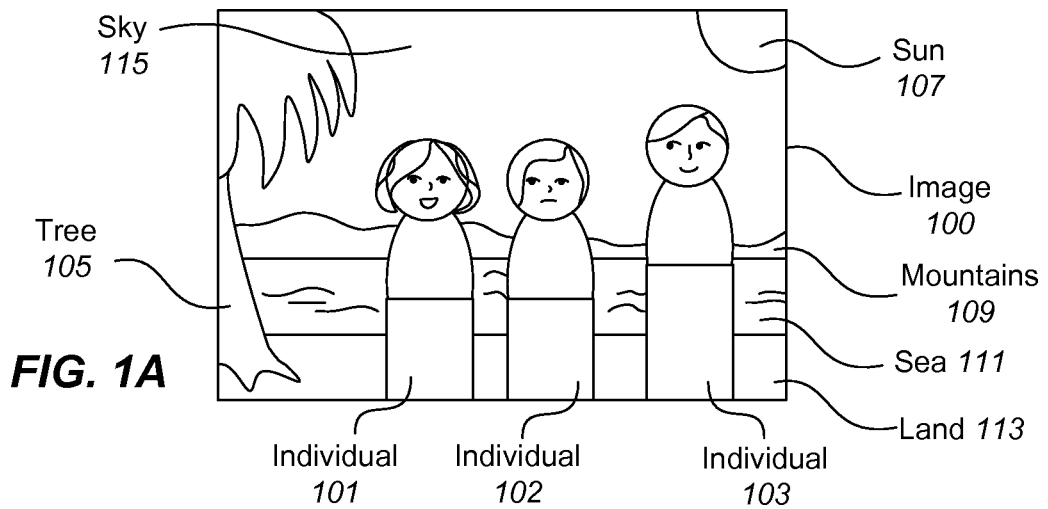
FIG. 1A illustrates one example of an image before removing an individual.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Many photographs include memories of various life events and experiences. However, some pictures that include an individual such as an ex-spouse, former friend, former acquaintance, or other person may evoke negative or unfavorable memories. These pictures may also include other people, scenery, monuments, etc. that may have elements that evoke positive memories or would be beneficial to keep. Accordingly, this disclosure includes examples of mechanisms and processes that preserve positive aspects of photographic memories, while removing negative aspects of photographic memories.

According to various embodiments, a user may want to remove an individual appearing in pictures from a particular event, experience, or other memory. At the same time the user may want to keep aspects of these pictures like pictures of themselves, their kids, other family members, etc. By removing a particular individual from a photo or group of photos, the aim is not necessarily to alter the reality or accuracy of the experience as it happened, but to edit out aspects of the experience that evoke bad feelings. Specifically, by removing a particular individual from a photo or group of photos, good parts of the memories can be emphasized without stirring up bad feelings.

The present disclosure includes various examples of processes and mechanisms that can be used to remove an individual from a photo or group of photos. In some examples, these processes and mechanisms can be automated or fully automated with a computer, such as by using a computer program, application, or software. Moreover, the various mechanisms and processes can be implemented on devices such as a computer, laptop, notebook computer, tablet computer, mobile device, or any other computing device. Various user inputs may include selecting a photo or photos to edit and a selection of the individual or individuals to remove from the photo or photos.

Figure 1B:
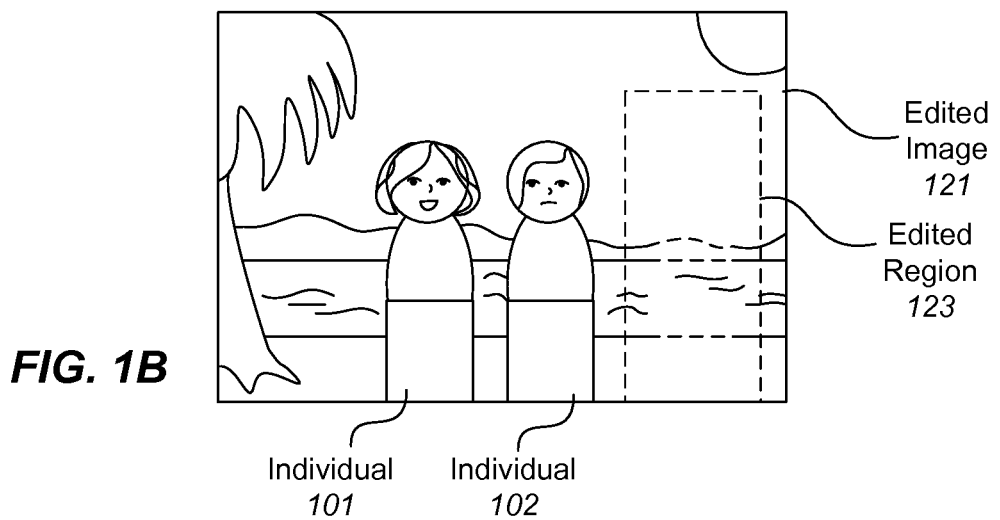
FIG. 1B illustrates an example of the image after removing an individual and using interpolation/extrapolation.
Figure 1C:
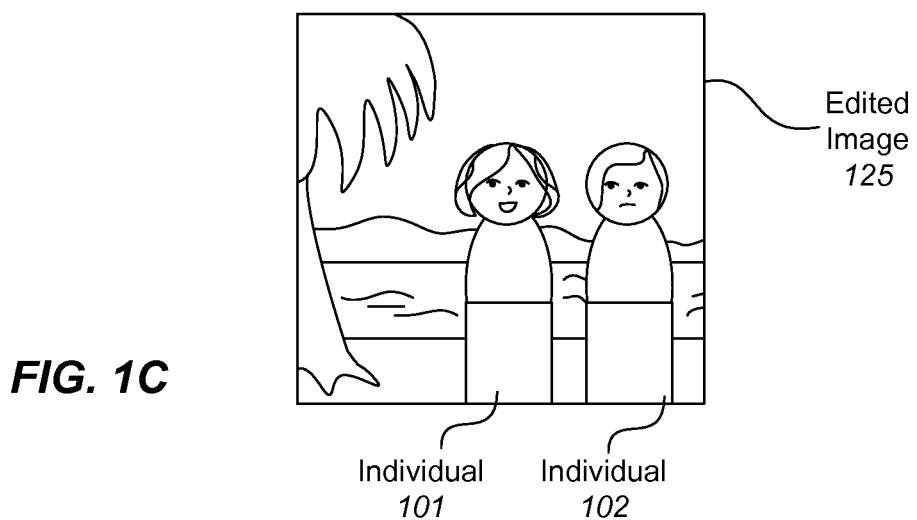
FIG. 1C illustrates an example of the image after removing an individual using cropping.

FIGS. 1A-1C illustrate examples of photos in which an individual is removed. In particular, the images shown include group photos in which the individual is originally situated at one end of the group. With reference to FIG. 1A, shown is one example of an image 100 before removal of the individual. In this example, individual 101, individual 102, and individual 103 are included in a group photo. Individual 103, who is located at one end of the group, is the individual to be removed from the photo. Surrounding elements in the image may include objects, people, backgrounds, monuments, or other items. In this example, surrounding elements include sky 115, tree 105, sun 107, mountains 109, sea 111, and land 113, as well as individuals 101 and 102.

According to various embodiments, a user selects preferences relating to removal of the individual. For instance, the preferences may whether to remove the individual completely from the image, whether to replace the individual with a substitute, and/or whether to retain selected individuals in the image. In particular examples, removing the individual completely includes removing facial and body features associated with the individual, and replacing the individual includes at least a facial substitution. In some cases, replacing the individual also includes a body substitution or alteration, such as a change of clothes, colors of clothes, etc. Additionally, preferences may be selected regarding whether to keep particular surrounding elements.

With reference to FIG. 1B, shown is one example of the image 100 after removing individual 103 and using interpolation/extrapolation. In particular, edited image 121 includes edited region 123 in which individual 103 has been removed. Surrounding elements, including individuals 101 and 102 remain in the image. In some examples, individual 103 is removed from the image, such as by removing any detected facial features and body features. Any void or gap in the image caused by removal of individual 103 is then filled in using interpolation and/or extrapolation, as appropriate. For instance, background interpolation and/or extrapolation can be used to estimate the background characteristics using the surrounding areas still remaining in the image. In the present example, the interpolated/extrapolated aspects within edited region 123 are indicated with dashed lines.

With reference to FIG. 1C, shown is one example of the image 100 after removing individual 103 using cropping. In particular, edited image 125 includes individual 101 and 102, along with surrounding elements. However, individual 103, along with surrounding elements near individual 103 have been cropped out of the image. Accordingly, removal of individual 103 involves cropping and removal of individual 103 and surrounding elements. In the present example, the size of the edited image 125 differs from the original image 100. However, the image can be resized or proportions constrained in some examples, depending on the desires of the user. Additionally, although one possible cropping is shown, the edited image 125 can be cropped in various ways to remove individual 103. For instance, some of the top portion of the image can also be cropped, the left side can be cropped, etc., depending on the desires of the user.

Although the present examples include using removal, interpolation/extrapolation, and cropping, other ways of removing an individual can also be used. For instance, blurring facial features and/or body features associated with the individual can be done in some cases. In particular, if the individual appears in the background, the individual can be blurred to make them less conspicuous or even unrecognizable. Additionally, portions of the image surrounding the individual to be removed can also be blurred in some cases.

Figure 2A:
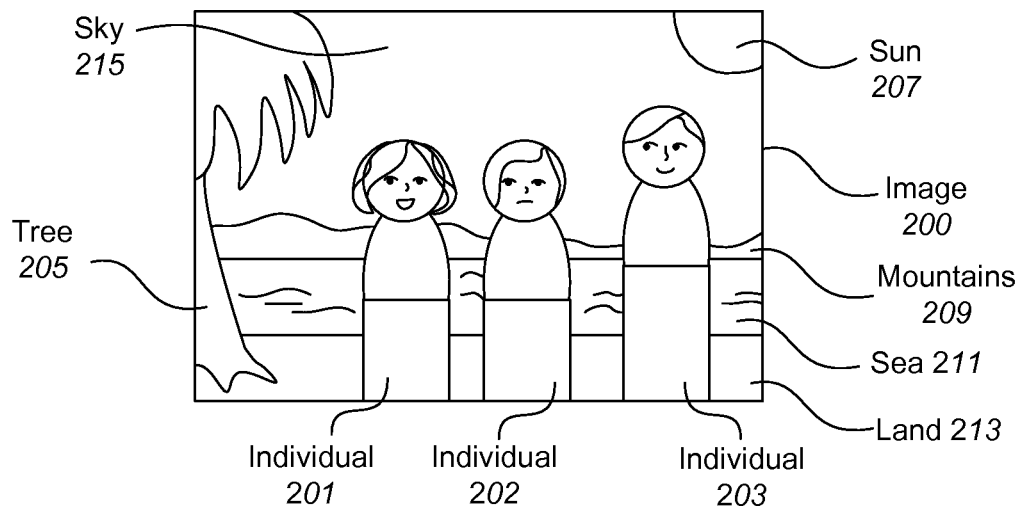
FIG. 2A illustrates one example of an image before removing an individual.

FIGS. 2A-2E illustrate additional examples of photos in which an individual is removed. In particular, the images shown include group photos in which the individual is originally situated between other members of the group. With reference to FIG. 2A, shown is one example of an image 200 before removal of the individual. In this example, individual 201, individual 202, and individual 203 are included in a group photo. Individual 202, who is located between individual 201 and individual 203, is the individual to be removed from the photo. As described above with regard to FIG. 1A, surrounding elements in the image may include objects, people, backgrounds, monuments, or other items. In this example, surrounding elements include sky 215, tree 205, sun 207, mountains 209, sea 211, and land 213, as well as individuals 201 and 203.

According to various embodiments, a user selects preferences relating to removal of the individual. For instance, the preferences may indicate whether to remove the individual completely from the image, whether to replace the individual with a substitute, and/or whether to retain selected individuals in the image. In particular examples, removing the individual completely includes removing facial and body features associated with the individual, and replacing the individual includes at least a facial substitution. In some cases, replacing the individual also includes a body substitution or alteration, such as a change of clothes, colors of clothes, etc. Additionally, preferences may be selected regarding whether to keep particular surrounding elements.

Figure 2B:
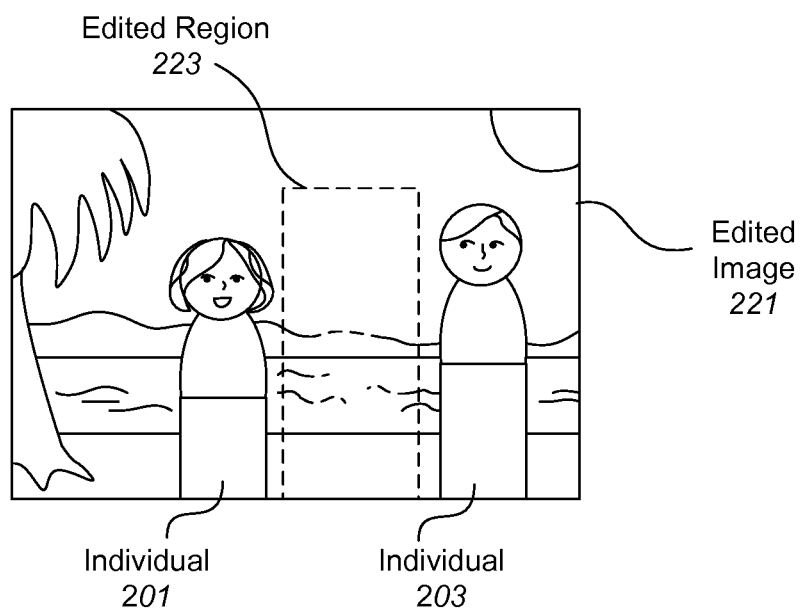
FIG. 2B illustrates an example of the image after removing an individual and using interpolation/extrapolation.

With reference to FIG. 2B, shown is an example of the image 200 after removing individual 202 using interpolation/extrapolation. In particular, edited image 221 includes edited region 223 in which individual 202 has been removed. Surrounding elements, including individuals 201 and 203 remain in the image. In some examples, individual 202 is removed from the image, such as by removing any detected facial features and body features. Any void or gap in the image caused by removal of individual 202 is then filled in using interpolation and/or extrapolation, as appropriate. For instance, background interpolation and/or extrapolation can be used to estimate the background characteristics using the surrounding areas still remaining in the image. In the present example, the interpolated/extrapolated aspects within edited region 223 are indicated with dashed lines.

Figure 2C:
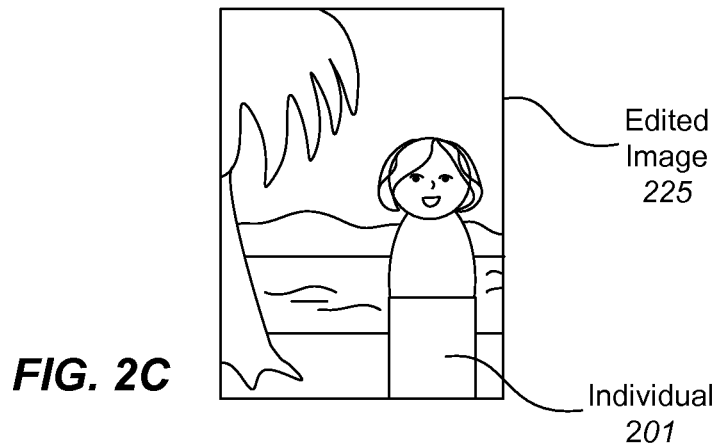
FIG. 2C illustrates an example of the image after removing an individual using cropping.

According to various embodiments, removal of individual 202 and using interpolation/extrapolation may be chosen in cases when the user indicates that they would like to keep selected individuals 201 and 203 in the image. However, if the user indicates that they prefer to keep individual 201, without indicating any preference about individual 203, removal of individual 202 can alternatively be done with cropping as shown in FIG. 2C. Accordingly, if nothing is indicated about individual 203, either of the edited images 221 or 225, in FIGS. 2B and 2C, respectively, would be acceptable. Alternatively, if the user indicates that they prefer to keep individual 203, without indicating any preference about individual 201, removal of individual 202 can be done with cropping as shown in FIG. 2D or with removal and interpolation/extrapolation as shown in FIG. 2B.

With reference to FIG. 2C, shown is one example of the image 200 after removing individual 202 using cropping. In particular, edited image 225 includes individual 201, along with surrounding elements. However, individuals 202 and 203, along with surrounding elements near these individuals have been cropped out of the image. Accordingly, removal of individual 202 involves cropping and removal of individuals 202, 203, and surrounding elements. In the present example, the size of the edited image 225 differs from the original image 200. However, the image can be resized or proportions constrained in some examples, depending on the desires of the user. Additionally, although one possible cropping is shown, the edited image 225 can be cropped in various ways to remove individual 202. For instance, some of the top portion of the image can also be cropped, the left side can be cropped, etc., depending on the desires of the user.

In the present example, both individuals 202 and 203 have been cropped from the image to remove individual 202. This cropping may be appropriate if the user indicates that they prefer to keep individual 201, without indicating any preference about individual 203, or if the user indicates that they prefer to keep individual 201 and wish to remove both individuals 202 and 203. Other preferences may include keeping tree 205, but removing individual 202. Accordingly, cropping may be chosen depending on the user's preferences regarding surrounding elements in the image.

Figure 2D:
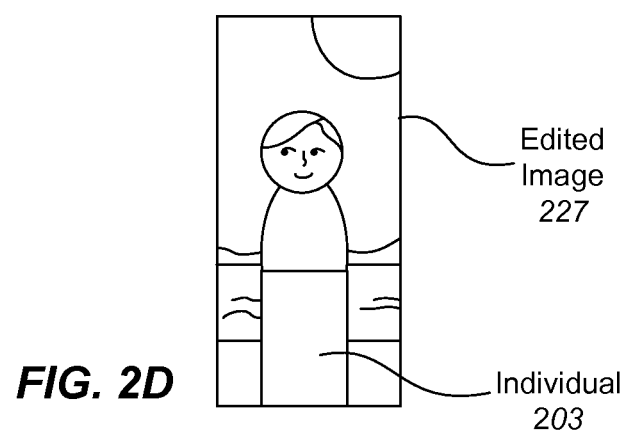
FIG. 2D illustrates another example of the image after removing an individual using cropping.

With reference to FIG. 2D, shown is another example of the image 200 after removing individual 202 using cropping. In particular, edited image 227 includes individual 203, along with surrounding elements. However, individuals 201 and 202, along with surrounding elements near these individuals have been cropped out of the image. Accordingly, removal of individual 202 involves cropping and removal of individuals 202, 203, and surrounding elements. In the present example, the size of the edited image 227 differs from the original image 200. However, the image can be resized or proportions constrained in some examples, depending on the desires of the user. Additionally, although one possible cropping is shown, the edited image 227 can be cropped in various ways to remove individual 202. For instance, some of the top portion of the image can also be cropped, the left side can be cropped, etc., depending on the desires of the user.

In the present example, both individuals 201 and 202 have been cropped from the image to remove individual 202. This cropping may be appropriate if the user indicates that they prefer to keep individual 203, without indicating any preference about individual 201, or if the user indicates that they prefer to keep individual 203 and wish to remove both individuals 201 and 202. Other preferences may include keeping sun 207, but removing individual 202. Accordingly, cropping may be chosen depending on the user's preferences regarding surrounding elements in the image.

Figure 2E:
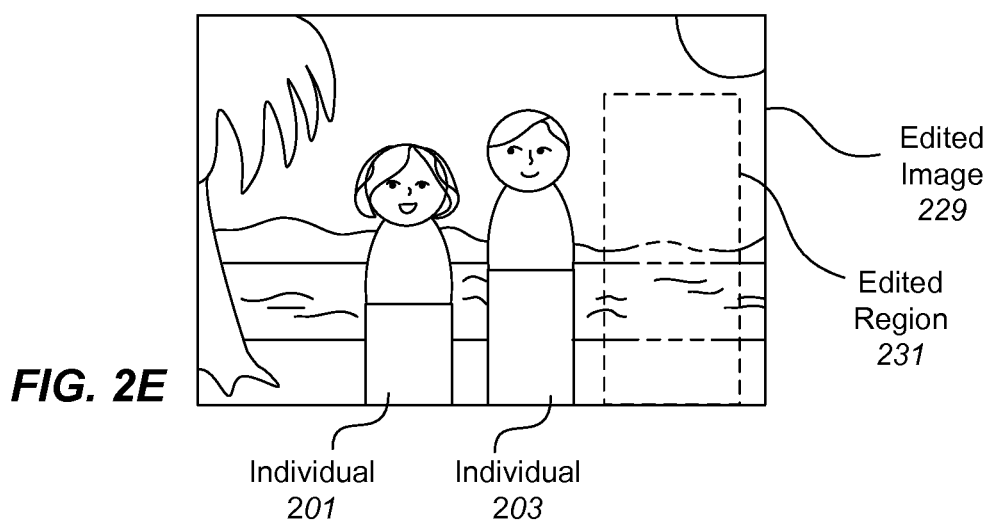
FIG. 2E illustrates an example of the image after removing and replacing an individual and using interpolation/extrapolation.

With reference to FIG. 2E, shown is one example of the image 200 after removal of individual 202 using replacement and interpolation/extrapolation. In particular, edited image 229 includes individuals 201 and 203, along with surrounding elements, including edited region 231. In the present example, individual 202 has been replaced by individual 203. In particular, individual 203 has been carefully removed from the edited region 231 (such as by detecting facial, head, and body features and cutting these out) and pasted over individual 202. Accordingly, removing individual 202 includes replacing the facial features and body features associated with individual 202 with individual 203. Any void or gap in edited region 231 caused by removal of individual 203 is then filled in using interpolation and/or extrapolation, as appropriate. For instance, background interpolation and/or extrapolation can be used to estimate the background characteristics using the surrounding areas still remaining in the image. In the present example, the interpolated/extrapolated aspects within edited region 231 are indicated with dashed lines.

Although individual 203 was pasted over individual 202 in the present example, individual 202 can be replaced by individual 203 in other ways. For instance, individual 202 can be removed from the image, such as by detecting facial, head, and body features and cutting these out of the image. This removal causes a void in the image in the shape of a silhouette of individual 202. Individual 203 can be removed from edited region 231 such as by detecting facial, head, and body features and cutting these out. Individual 203 can then be placed where individual 202 was located previously. Accordingly, removing individual 202 includes replacing the facial features and body features associated with individual 202 with individual 203. Any void or gap between individual 203 and the silhouette of individual 202 caused by removal of individual 202 is then filled in using interpolation and/or extrapolation, as appropriate. For instance, background interpolation and/or extrapolation can be used to estimate the background characteristics using the surrounding areas still remaining in the image. In the present example, no interpolation/extrapolation was necessary to account for the void left by individual 202 because individual 203 was larger than individual 202 and individual 203 covered the entire silhouette of the removed individual 202. However, the void or gap in edited region 231 caused by removal of individual 203 is still filled in using interpolation and/or extrapolation, as appropriate. For instance, background interpolation and/or extrapolation can be used to estimate the background characteristics using the surrounding areas still remaining in the image. In the present example, the interpolated/extrapolated aspects within edited region 231 are indicated with dashed lines.

According to various embodiments, removal of individual 202 and using interpolation/extrapolation may be chosen in cases when the user indicates that they would like to keep selected individuals 201 and 203 in the image. Accordingly, both edited images 221 and 231 in FIGS. 2B and 2E, respectively, can be offered as images having individual 202 removed, while keeping individuals 201 and 203. Other preferences may include keeping sun 207 and tree 205. Additionally, moving individual 203 to replace individual 202 can be done for aesthetic reasons, such as to eliminate an otherwise odd gap in the photo. Alternatively, individual 203 can be used to replace individual 202 but instead of including the edited region 231, in edited image 220, edited region 231 could be cropped out of the image in some examples. Another alternative includes replacing facial features associated with individual 202. For instance, a different head can used to replace individual 202's head and/or facial features. Accordingly, edits may be chosen depending on the user's preferences regarding surrounding elements in the image.

Although the present examples include using removal, interpolation/extrapolation, and cropping, other ways of removing an individual can also be used. For instance, blurring facial features and/or body features associated with the individual can be done in some cases. In particular, if the individual appears in the background, the individual can be blurred to make them less conspicuous or even unrecognizable. Additionally, portions of the image surrounding the individual to be removed can also be blurred in some cases.

Figure 3:
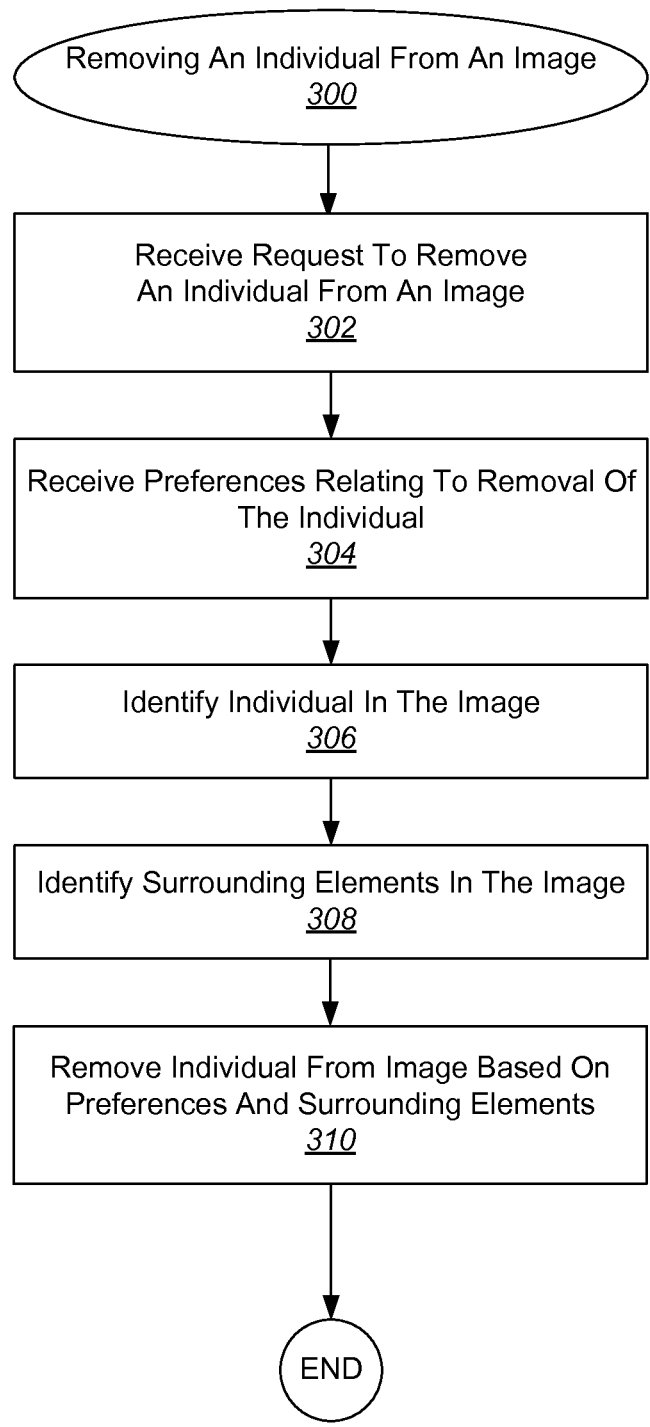
FIG. 3 illustrates an example of a process for removing an individual from an image.

As described in conjunction with FIGS. 1A-2E, removing an individual from an image can result in one of various edited images, depending on the preferences of the user. One process that can be used to remove an individual from an image is described in conjunction with FIG. 3. In particular, with reference to FIG. 3, shown is an example of a process 300 for removing an individual from an image. According to various embodiments, this process can be automated and carried out by a system, such as a computing device. The computing device can be a computer, mobile device, tablet, notebook, or the like, as described in more detail with regard to FIG. 6 below.

In the present example, a request to remove an individual from an image is received. This request can be received at a system, such as a computing device. The image can be stored in an image repository, from which it is retrieved after the request is made. In various examples, the image repository is a photo and/or video library. This can be stored locally on a computing device associated with the user or in a remote library, such as on the cloud, etc. The request can be made in various ways, such as by selecting the individual's face in the image, such as by a cursor or by creating a bounding box around the individual's face and selecting a "remove" button.

Next, preferences relating to removal of the individual are received at 304. These preferences can include various preferred selections such as whether to remove the individual completely from the image, whether to replace the individual with a substitute, and whether to retain selected individuals in the image. According to various embodiments, removing the individual completely includes removing body features associated with the individual, and replacing the individual includes at least a facial substitution. Other preferences can also be indicated, such as whether to retain or remove particular surrounding elements, whether to constrain proportions of the image, whether to keep other surrounding elements in their original locations, etc. Although obtaining preferences from the user assists the system in making decisions about how to edit the image, these preferences are not necessary in some embodiments. In those cases, the system will have default preferences specified in order to make the edits.

In the present example, the individual is identified in the image at 306. Specifically, facial features associated with the individual are identified. In some embodiments, body features associated with the individual are also identified. Specifically, if the individual is to be replaced or modified, identifying facial and body features of the individual are useful. However, if only a facial substitution is requested, then only the facial features associated with the individual may need to be identified.

Next, surrounding elements in the image are identified at 308. These surrounding elements include any selected individuals and/or any selected objects or features that the user wishes to keep in the edited image. The individual is then removed from the image based on the preferences relating to removal of the individual and the surrounding elements at 310.

As described above with regard to FIGS. 1A-2E above, removing the individual can be accomplished in various ways. For instance, in some cases, removing the individual includes cropping the individual from the image. In other cases, removing the individual includes replacing the facial features associated with the individual. In yet other cases, removing the individual includes replacing the facial features and body features associated with the individual. In addition, removing the individual may also involve using background extrapolation and/or background interpolation in some cases. As also described above, removing the individual may include blurring facial features and body features associated with the individual. In these cases, aspects of the image surrounding the individual may also be blurred. In particular, blurring the individual may make them blend into the scenery, but blurring surrounding aspects may also be appropriate to allow the individual to blend. For instance, a particular feature of the image can be kept in focus and other aspects, including the individual and surrounding aspects can be blurred to create an artistic effect, as well as serving to effectively remove the individual from the photo or focus of the photo.

Once the individual is removed from the image, the edited image can be displayed to the user. In some embodiments, multiple edited images can be shown to the user. For instance, referring back to FIGS. 2A-E, two or more of the images shown in FIGS. 2B-2E can be presented. If these alternatives are displayed to the user, then the user can select which of the edited images that they wish to keep.

Figure 4:
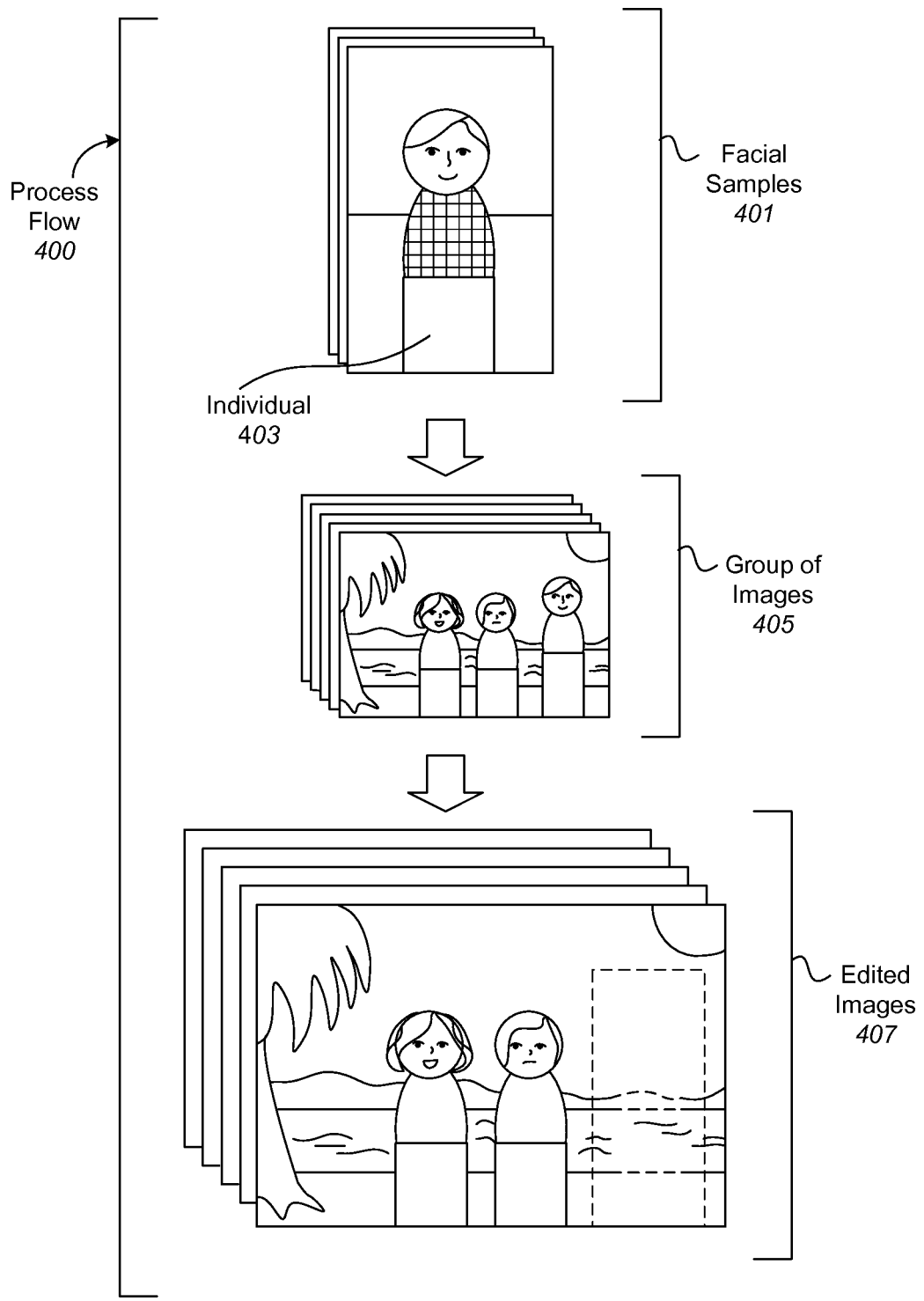
FIG. 4 illustrates an example of a process flow for removing an individual from a group of images.

FIG. 4 illustrates an example of a process flow 400 for removing an individual 403 from a group of images. In this process, one or more facial samples 401 associated with the individual 403 are provided by a user. Each of these facial samples 401 includes a portrait of the individual or a selection of the individual's face from a group photo. For instance, the individual's face can be selected from a group photo with a cursor or bounding box. The facial samples 401 can be obtained from an image repository such as a photo and/or video library in some examples. The repository can be located on a computing device associated with the user or in a remote library, such as on the cloud, etc.

Next, in the present example, a group of images 405 is provided. The group of images can include still images and/or videos, which can also be stored in an image repository such as a photo and/or video library. In some instances, the group of images may represent a video segment and removing the individual from the images includes removing the individual from the video segment.

Based on the facial samples 401 provided, the individual is identified in each image in the group of images. According to various embodiments, identifying the individual in each image in the group of images includes using facial recognition to automatically find the individual in each image in the group of images. For each image, the individual 403 is identified and then removed from the image. In some examples, the manner in which individual 403 is removed depends on preferences specified by the user relating to individual 403, specified individuals, and/or surrounding elements. In other examples, the editing may be dependent upon default preferences stored by the system. As described in various examples above, editing the images can include actions such as cropping the individual 403 from the image, replacing facial features associated with individual 403, and/or replacing the facial features and body features associated with the individual. In addition, editing the images to remove individual 403 may also include using background extrapolation, background interpolation, blurring facial features and body features associated with individual 403, and/or blurring aspects of the image surrounding individual 403.

Once each image in the group of images 405 is edited, the edited images 407 are then provided to the user. In some embodiments, alternative versions of particular images may be provided to allow the user to select which edited images 407 to keep. These edited images can then be stored in an image repository in some examples.

Figure 5:
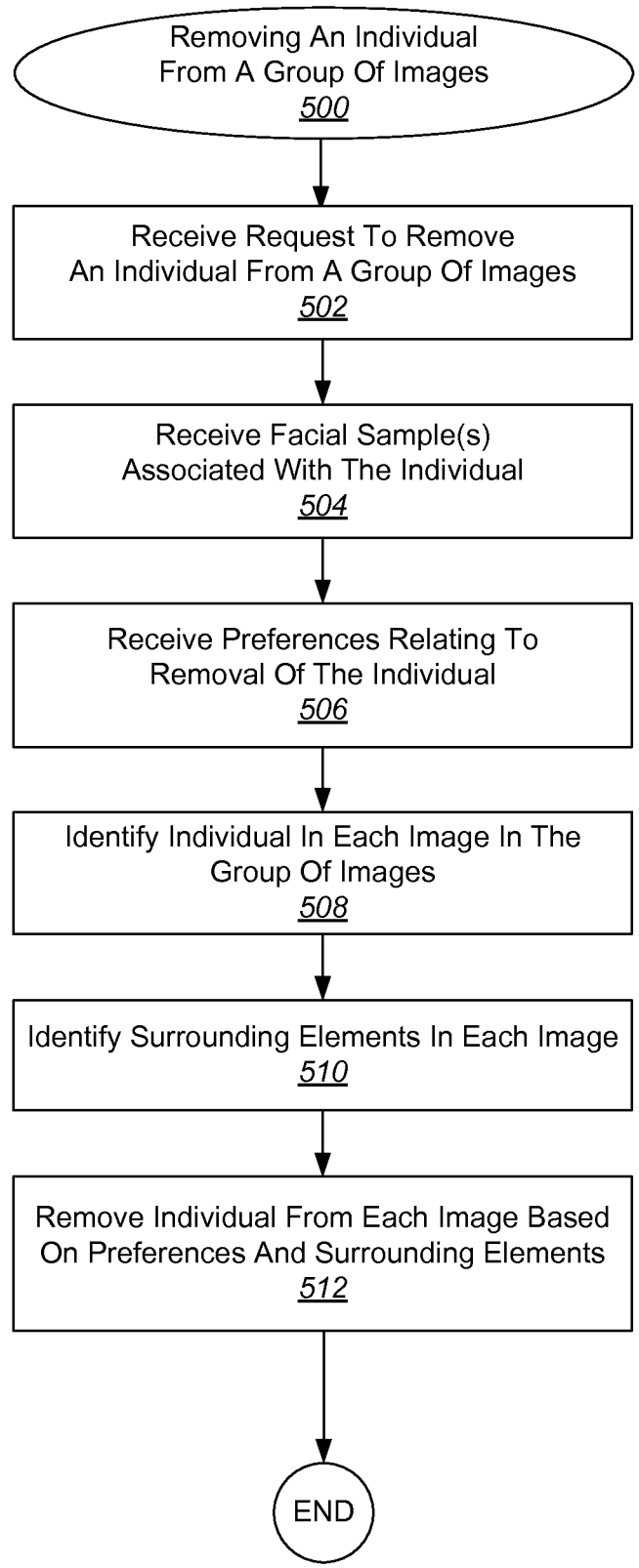
FIG. 5 illustrates an example of a process for removing an individual from a group of images.

With reference to FIG. 5, shown is another example of a process 500 for removing an individual from a group of images. This process begins when a request to remove an individual from a group of images is received at 502. According to various embodiments, these images may be stored in an image repository, such as an image or video library stored on a computing device, the cloud, etc. The group of images can include still images and/or videos, which can also be stored in an image repository such as a photo and/or video library. In some instances, the group of images may represent a video segment and removing the individual from the images includes removing the individual from the video segment.

Next, in the present example, one or more facial samples associated with the individual are received at 504. Each facial sample includes a portrait of the individual or a selection of the individual's face from a group photo. As described above, the facial samples can be provided by the user in some examples.

According to various embodiments, preferences are then received relating to removal of the individual at 506. Preferred selections may include aspects such as whether to remove the individual completely from the group of images, whether to replace the individual with a substitute, and/or whether to retain selected individuals in the series of images. According to various embodiments, removing the individual completely includes removing body features associated with the individual, and replacing the individual includes at least a facial substitution. Other preferences can also be indicated, such as whether to retain or remove particular surrounding elements, whether to constrain proportions of the image, whether to keep other surrounding elements in their original locations, etc. Although obtaining preferences from the user assists the system in making decisions about how to edit the image, these preferences are not necessary in some embodiments. In those cases, the system will have default preferences specified in order to make the edits.

Based on the facial samples provided previously, the individual is identified in each image in the group of images at 508. According to various embodiments, identifying the individual in each image in the group of images includes using facial recognition to automatically find the individual in each image in the group of images. Next, surrounding elements in each image in the group of images are identified at 510. These surrounding elements include any selected individuals that the user wishes to keep in the images, or other items, objects, or surroundings the user wishes to keep. In some examples, identifying surrounding elements at 510 can be omitted, such as when the user has not specified any preference to keep any surrounding elements in the edited images.

In the present example, the individual is removed from each image in the group of images based on the preferences specified at 506. In particular, each image in the group of images is edited based on the preferences specified, if any, and the surrounding elements. As described in various examples above, editing the images can include actions such as cropping the individual from the image, replacing facial features associated with individual, and/or replacing the facial features and body features associated with the individual. In addition, editing the images to remove individual may also include using background extrapolation, background interpolation, blurring facial features and body features associated with individual, and/or blurring aspects of the image surrounding individual.

Once each image in the group of images is edited, the edited images are then provided to the user. In some embodiments, alternative versions of particular images may be provided to allow the user to select which edited images to keep. Edited images can then be stored in an image repository in some examples.

Figure 6:
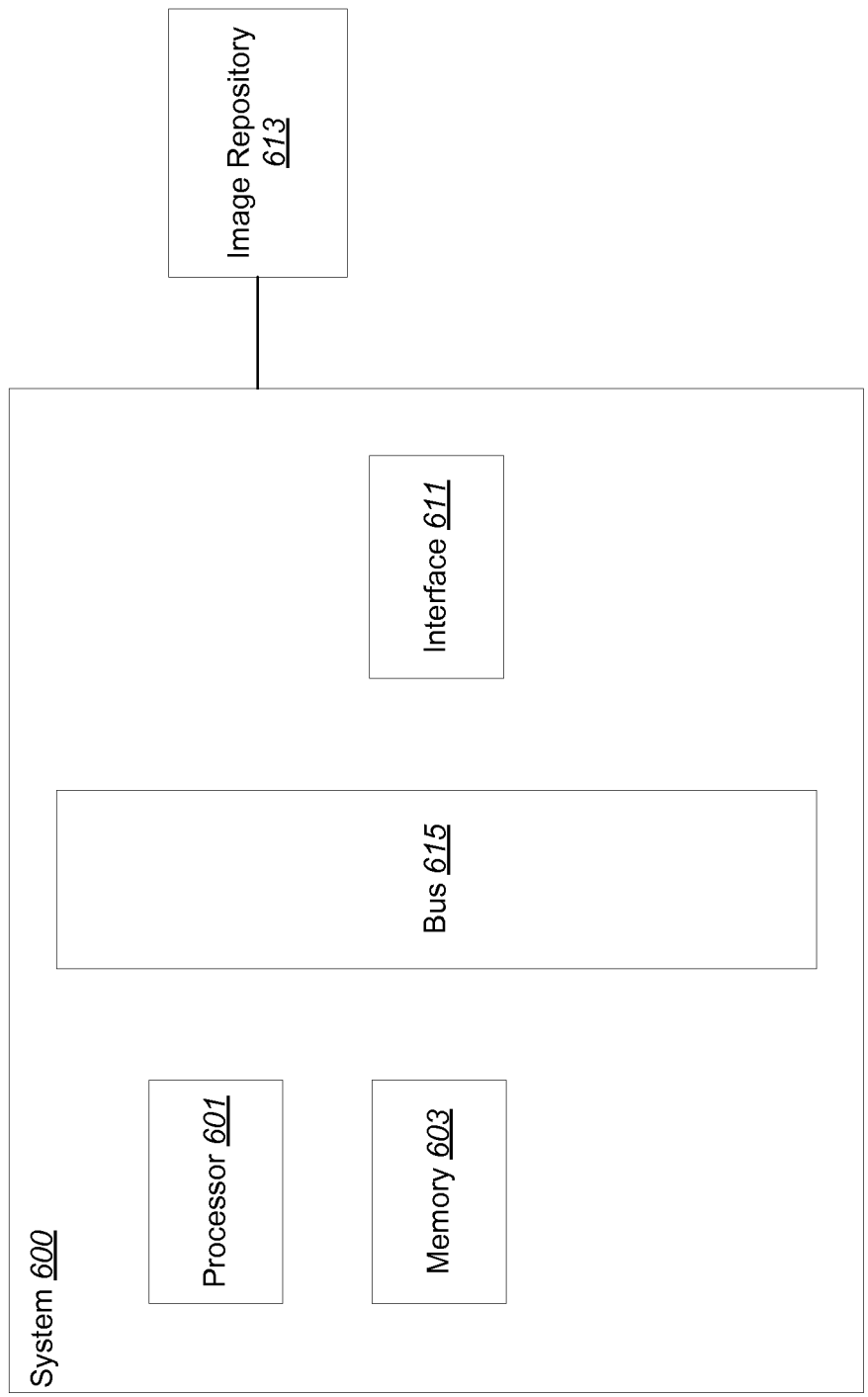
FIG. 6 illustrates one example of a system that can be used to remove an individual from an image or group of images.

With reference to FIG. 6, shown is a particular example of a computer system that can be used to implement particular examples of the present invention. For instance, the computer system 600 can be used to remove an individual from an image or group of images, according to various embodiments described above. In addition, the system 600 can represent a computing device, such as a mobile device, computer, laptop, etc. that can be used to automatically perform the processes described in various examples in this disclosure.

According to particular example embodiments, a system 600 suitable for implementing particular embodiments of the present invention includes a processor 601, a memory 603, an interface 611, and a bus 615 (e.g., a PCI bus). The interface 611 may include separate input and output interfaces, or may be a unified interface supporting both operations. When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

In the present example shown, the system has access to an image repository 613, which can include an image library, video library, etc. In some embodiments, the image repository 613 can be separate from system 600, such as when it is located on the cloud or other remote storage platform. In other embodiments, which are not shown, the image repository 613 can be included as part of system 600, such as when the image repository 613 resides on a local computing device, such as on a computer, mobile device, smartphone, tablet, notebook, etc.

Because various information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method comprising:
    receiving a request to remove an individual from an initial image, the initial image stored in an image repository, wherein the request includes a selection of the individual's face in the initial image;
    receiving one or more preferences relating to removal of the individual, including preferred selections about a) whether to remove the individual completely from the initial image, b) whether to replace the individual with a substitute object, and c) whether to retain selected individuals in the initial image, wherein removing the individual completely includes removing facial and body features associated with the individual, and wherein replacing the individual partially includes at least a facial substitution;
    identifying the individual in the initial image, including facial features associated with the individual and body features associated with the individual;
    identifying surrounding elements in the initial image, wherein the surrounding elements include any selected individuals; and
    generating a first edited image by:
        removing the individual from the initial image based on the preferences relating to removal of the individual, wherein removing the individual completely creates a void in an edited region,
        positioning an image of the substitute object over a position of the void, and
        filling in remaining portions of the void using one or more of background interpolation and background extrapolation.

2. The method of claim 1, wherein removing the individual includes replacing the facial features and body features associated with the individual.

3. The method of claim 1, further comprising:
    generating a second edited image by:
        removing the individual from the initial image based on the preferences relating to removal of the individual, wherein removing the individual completely creates the void in the edited region,
        replacing the void using one or more of background interpolation and background extrapolation;
    generating a third edited image based on the one or more preferences by cropping out a portion of the image that includes the individual; and
    displaying the first edited image, the second edited image, and the third edited image for selection.

4. A method comprising:
receiving a request to remove an individual from a group of images, wherein the group of images is stored in an image repository;
receiving one or more facial samples associated with the individual, wherein each facial sample includes a portrait of the individual or a selection of the individual's face from a group photo;
receiving one or more preferences relating to removal of the individual, including preferred selections about a) whether to remove the individual completely from the group of images, b) whether to replace the individual with a substitute object, and c) whether to retain selected individuals in the group of images, wherein removing the individual completely includes removing body features associated with the individual, and wherein replacing the individual partially includes at least facial substitution;
identifying the individual in each image in the group of images;
identifying surrounding elements in each image in the group of images, wherein the surrounding elements include any selected individuals; and
generating a first set of edited images by:
removing the individual from each image in the group of images based on the preferences relating to removal of the individual, wherein removing the individual completely creates a void in an edited region of each image in the group of images,
positioning an image of the substitute object over a position of the void in each image in the group of images, and
filling in remaining portions of the void in each image in the group of images using one or more of background interpolation and background extrapolation.

5. The method of claim 4, wherein the group of images includes still images.

6. The method of claim 4, wherein the group of images represents a video segment, and the request includes removing the individual from the video segment.

7. The method of claim 4, wherein identifying the individual in the group of images includes using facial recognition to automatically find the individual in each image in the group of images.

8. The method of claim 4, further comprising:
generating a second set of edited images by:
removing the individual from each image in the group of images based on the preferences relating to removal of the individual, wherein removing the individual completely creates the void in the edited region of each image in the group of images,
replacing the void in each image in the group of images using one or more of background interpolation and background extrapolation;
generating a third set of edited images based on the one or more preferences by cropping out a portion of each image in the group of images that includes the individual; and
displaying the first set of edited images, the second set of edited images, and the third set of edited images for selection.

9. A non-transitory computer readable medium storing one or more programs for execution by a computer system, the one or more programs comprising instructions for:
receiving a request to remove an individual from a group of images, wherein the group of images is stored in an image repository;
receiving one or more facial samples associated with the individual, wherein each facial sample includes a portrait of the individual or a selection of the individual's face from a group photo;
receiving one or more preferences relating to removal of the individual, including preferred selections about a) whether to remove the individual completely from the group of images, b) whether to replace the individual with a substitute object, and c) whether to retain selected individuals in the group of images, wherein removing the individual completely includes removing body features associated with the individual, and wherein replacing the individual partially includes at least facial substitution;
identifying the individual in each image in the group of images;
identifying surrounding elements in each image in the group of images, wherein the surrounding elements include any selected individuals; and
generating a first set of edited image by:
removing the individual from each image in the group of images based on the preferences relating to removal of the individual, wherein removing the individual completely creates a void in an edited region of each image in the group of images;
positioning an image of the substitute object over a position of the void in each image in the group of images, and
filling in remaining portions of the void in each image in the group of images using one or more of background interpolation and background extrapolation.

10. The non-transitory computer readable medium of claim 9, wherein the one or more programs further comprise instructions for:
generating a second set of edited images by:
removing the individual from each image in the group of images based on the preferences relating to removal of the individual, wherein removing the individual completely creates the void in the edited region of each image in the group of images,
replacing the void in each image in the group of images using one or more of background interpolation and background extrapolation;
generating a third set of edited images based on the one or more preferences by cropping out a portion of each image in the group of images that includes the individual; and
displaying the first set of edited images, the second set of edited images, and the third set of edited images for selection.

* * * * *